United States Patent [19]
Pank

[11] Patent Number: 5,746,911
[45] Date of Patent: May 5, 1998

[54] APPARATUS FOR SEPARATING A LIGHT FROM A HEAVY FLUID

[76] Inventor: Thomas E. Pank, 10546 Harp Rd., Walkersville, Md. 21793

[21] Appl. No.: 782,373

[22] Filed: Jan. 13, 1997

Related U.S. Application Data

[60] Provisional application No. 60/010,380 Jan. 23, 1996 and provisional application No. 60/010,791 Jan. 29, 1996.

[51] Int. Cl.⁶ .................................................. C02F 1/40
[52] U.S. Cl. ..................... 210/170; 210/254; 210/532.1; 210/538
[58] Field of Search ................................. 210/154, 170, 210/254, 257.1, 521, 532.1, 538, 540

[56] References Cited

U.S. PATENT DOCUMENTS

| | | | |
|---|---|---|---|
| 1,778,326 | 10/1930 | Kutzer. | |
| 2,820,550 | 1/1958 | Sorg | 210/519 |
| 3,258,123 | 6/1966 | Fontaine | 210/259 |
| 3,282,436 | 11/1966 | Malm | 210/532.1 |
| 3,374,894 | 3/1968 | Webster | 210/532.1 |
| 3,862,040 | 1/1975 | Preus et al. | 210/540 |
| 3,904,524 | 9/1975 | Pelton | 210/170 |
| 4,039,458 | 8/1977 | Maisonneuve | 210/513 |
| 4,136,010 | 1/1979 | Pille | 210/164 |
| 4,238,333 | 12/1980 | Tidwell | 210/540 |
| 4,363,731 | 12/1982 | Filippi | 210/532.1 |
| 4,385,986 | 5/1983 | Jaisinghani | 210/538 |
| 4,396,508 | 8/1983 | Broughton | 210/522 |
| 4,578,188 | 3/1986 | Cousino | 210/170 |
| 4,684,467 | 8/1987 | Cloud | 210/532.1 |
| 4,985,148 | 1/1991 | Monteith | 210/532.1 |
| 5,122,280 | 6/1992 | Russell, et al. | 210/532.1 |
| 5,143,611 | 9/1992 | Pate, Jr. | 210/256 |
| 5,196,123 | 3/1993 | Guthy | 210/540 |
| 5,246,592 | 9/1993 | Schweizer | 210/538 |
| 5,405,538 | 4/1995 | Batten | 210/540 |
| 5,433,845 | 7/1995 | Greene et al. | 210/170 |
| 5,498,331 | 3/1996 | Monteith | 210/170 |
| 5,531,888 | 7/1996 | Geiger et al. | 210/170 |

*Primary Examiner*—Christopher Upton
*Attorney, Agent, or Firm*—William D. Hall

[57] ABSTRACT

The oil is separated from the rainwater that runs off of a parking lot or off of the pavement of a filling station. An inlet tank receives the runoff water. When the water is entering that tank at a very low rate, the surface water and/or oil in the inlet tank drains to a main separation tank where the oil floats on clean water. That clean water is fed to an outlet conduit that feeds unpolluted water to the city sewer or to a river. When the inlet flow increases to an intermediate rate, a pipe of inverted L-shape feeds clean water from the inlet tank to the outlet conduit. When the inlet fluid has a very large flow rate, as might occur during a heavy downpour of rain, the fluid level in the inlet tank rises to a level at which there is a direct overflow into the outlet conduit.

17 Claims, 6 Drawing Sheets

FIG. I

APPARATUS FOR SEPARATING A LIGHT FROM A HEAVY FLUID

RELATED APPLICATIONS

This application is a continuation in part of my prior now abandoned Provisional Applications Ser. No. 60/010,380 filed Jan. 23, 1996 and Ser. No. 60/010,791, filed Jan. 29, 1996.

BACKGROUND OF THE INVENTION

Some local laws require the owners of filling stations, parking lots, etc. to remove the oil from the runoff water that drains from the premises. Oil enters said runoff water since automobiles often leak oil. Moreover, there may be spillage from a tanker truck. Such oil, if not removed from the runoff water, will pollute the river or other place which receives the runoff water.

Apparatus for removing oil from runoff water is available but the only commercial devices for removing oil from runoff water requires all of the parts to be shipped from the factory. See, for example, U.S. Pat. No. 4,985,148 granted Jan. 15, 1991 to Monteith. It is desirable to provide a system that can be fabricated and built by local contractors using locally available parts to the extent possible.

It is also desirable to provide apparatus for removing oil from runoff water that is more effective than the equipment now available. This improved effectiveness, in the present invention, involves improvements in systems that have two tanks. The prior art includes a number of patents wherein two tanks are used in processing water that is laden with oil. Such U.S. patents include:

Kuntzer 1,778,326
Sorg 2,820,550
Fontaine 3,258,123
Russell et al 5,122,280
Guthy 5,196,123
Schweizer et al. 5,246,592

None of these patents, however, solve the problem of handling the various problems involved in removing oil from runoff water. One of these problems involves the large variations in the rate of flow of the water. The rate of flow may be very low in the case of a very light rain and may be a very high rate as would be involved during a heavy thunderstorm.

SUMMARY OF THE INVENTION

The runoff water enters an inlet tank where oil floats on fairly clean water. When water enters the inlet tank at a low rate, the surface of the liquid in the inlet tank is fed to a main separation tank where again the oil floats and is thereby separated from the water.

Clean (below surface) water from the main separation tank is fed to an outlet conduit which delivers the clean water to a city sewer, river or the like.

If the runoff stream has an intermediate rate of flow, clean (below surface) water is fed from inlet tank directly to the outlet conduit. This path for the water is in addition to flow along the path described in the immediately preceding paragraph.

When the runoff water enters the inlet tank at a very high rate, for example during a thunderstorm, there is a third path for the water that is in addition to the two paths previously described. The runoff water takes this third path when the flow rate causes the inlet tank to fill to a given high level. The outlet conduit is fed directly by the inlet tank when the fluid in the inlet tank reaches the aforesaid high level.

Most, if not all, of the oil on the pavement of the filling station or parking lot is generally removed from the pavement, and separated from the water in said main separation tank, before the inlet tank is filled to said high level at which the inlet tank directly feeds said outlet conduit.

The present invention is more effective than any other system for cleaning runoff water.

In the preferred form of the invention, a small enclosure, mounted in the outlet conduit, receives the surface fluid of the inlet tank under normal conditions of a low intake flow rate. The fluid in said enclosure drains to said main separation tank. Under intermediate rates of fluid flow into the inlet tank, a further flow path through a pipe of inverted L-shape delivers clean water from the inlet tank directly to the outlet conduit. During very high rates of flow of the intake fluid, the fluid in the intake tank overflows said enclosure and passes directly to the outlet conduit. Clean water from the main separation tank is fed to the outlet conduit.

In one modified form of the invention, said enclosure is omitted. During periods of a low intake flow rate, surface fluid in the intake tank flows directly through a side wall of that tank to the pipe that feeds the main separation tank. An inverted L-shaped pipe feeds clean water from the inlet tank to the outlet conduit when the intake fluid has an intermediate flow rate. At high rates of intake flow, the fluid in the intake tank builds up in height until it overflows into the outlet conduit.

A further improvement is achieved if a baffle is mounted in the inlet tank in front of the opening into the outlet conduit. This baffle prevents oil from entering the outlet conduit.

DETAILED DESCRIPTION

Figure 1:
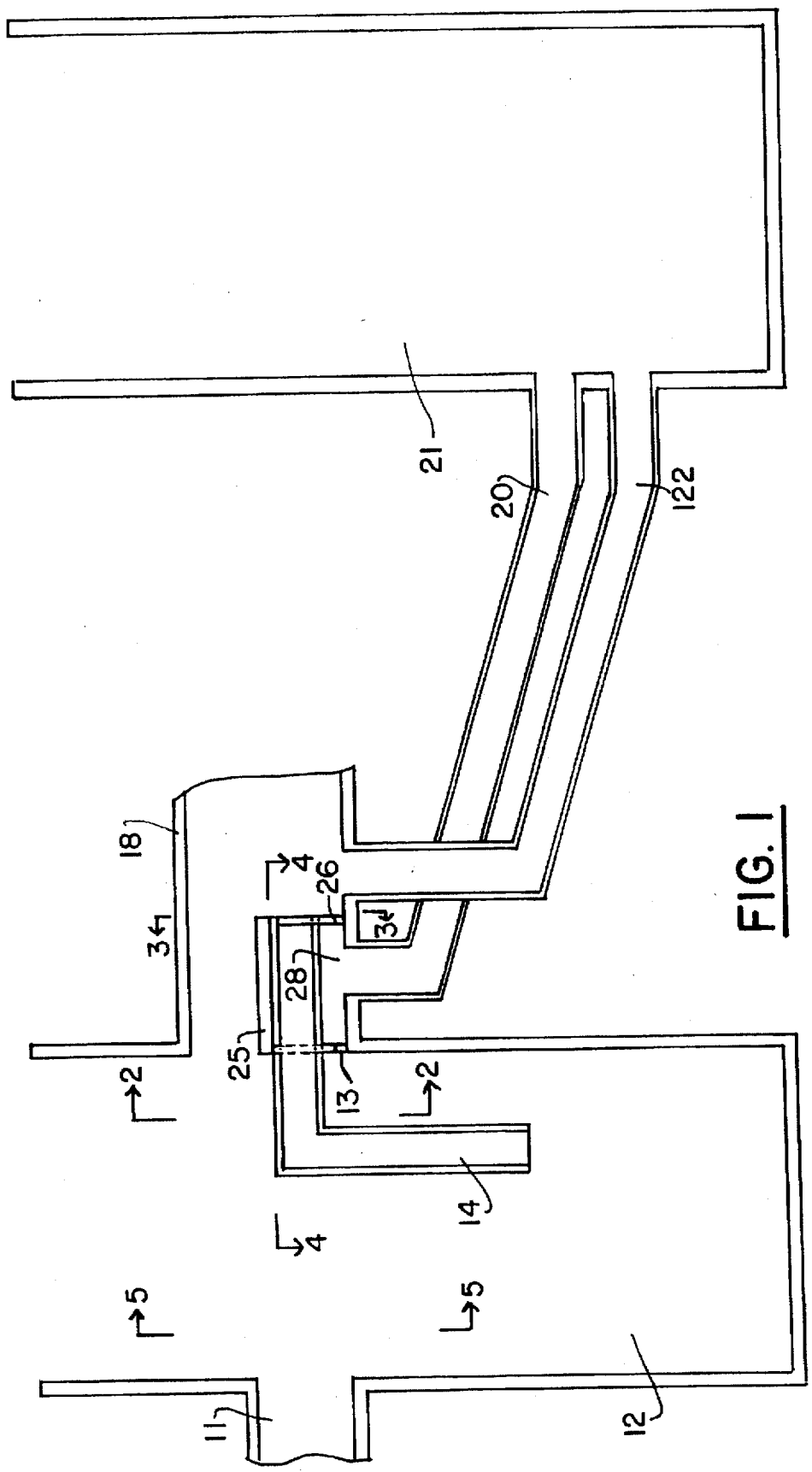
FIG. 1 is a vertical sectional view through the middle of a first embodiment of my invention.
Figure 2:
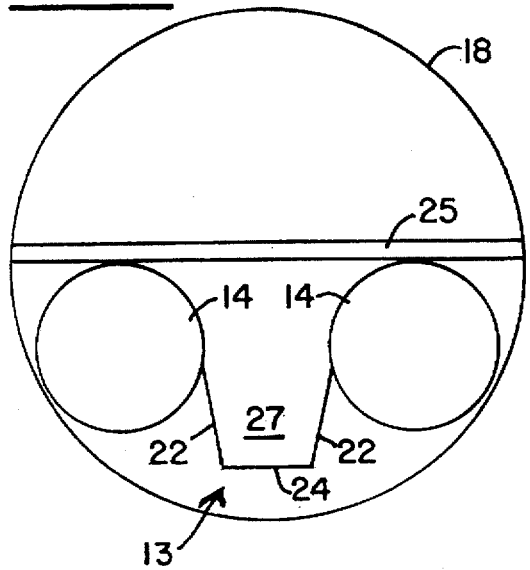
FIG. 2 is a sectional view along line 2—2 of FIG. 1.
Figure 3:
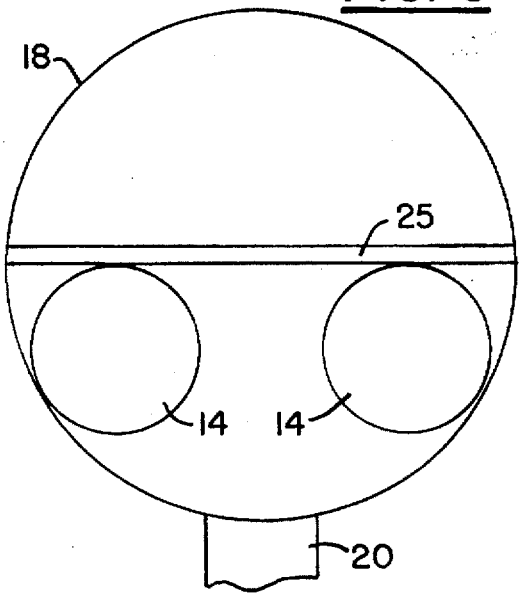
FIG. 3 is a sectional view along line 3—3 of FIG. 1.
Figure 4:
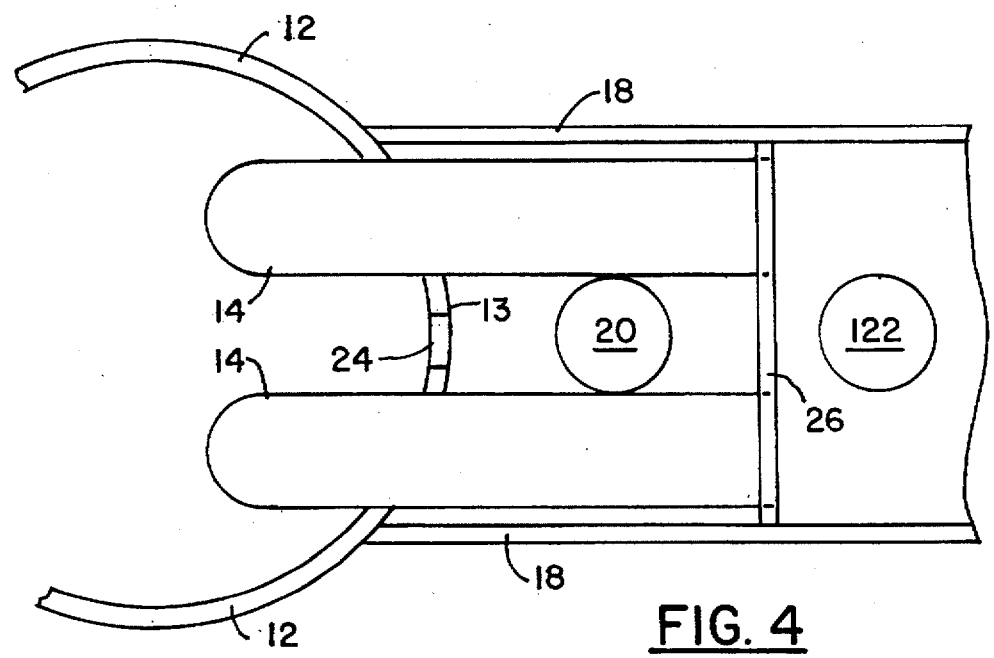
FIG. 4 is a sectional view along line 4—4 of FIG. 1.
Figure 5:
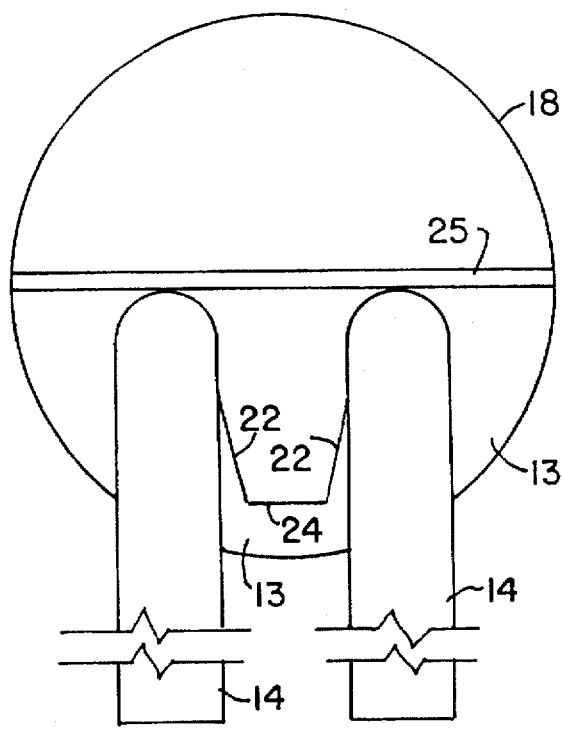
FIG. 5 is a sectional view along line 5—5 of FIG. 1.
Figure 6:
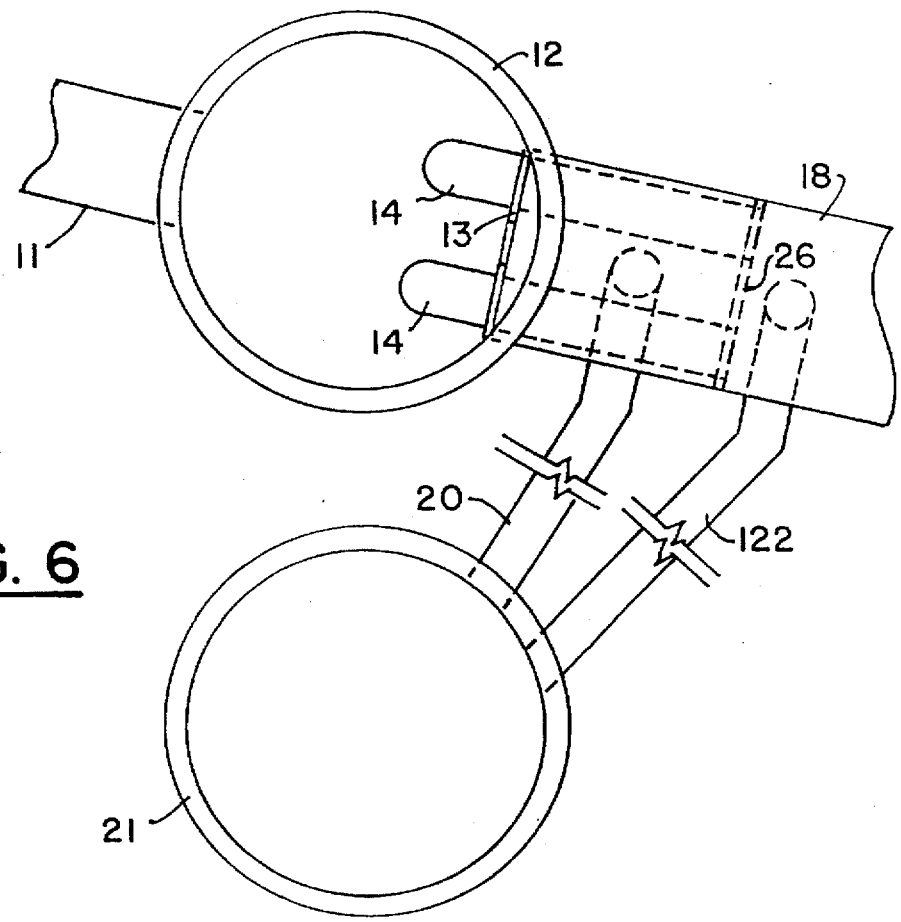
FIG. 6 is a top view of the embodiment of FIG. 1.
Figure 7:
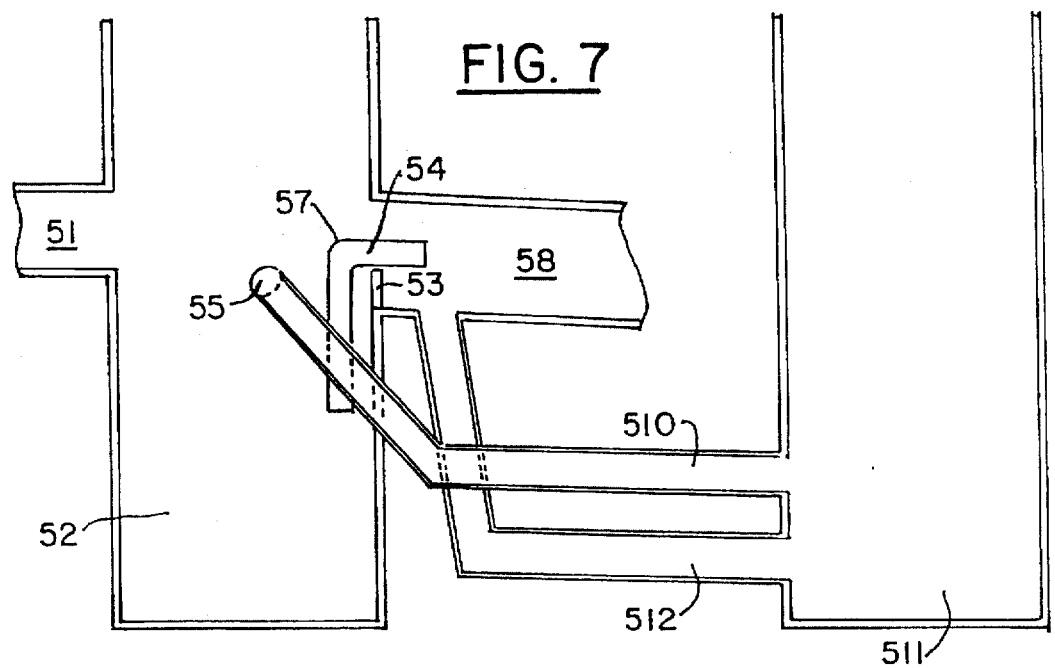
FIG. 7 is a schematic view of a first modified form of the invention.
Figure 8:
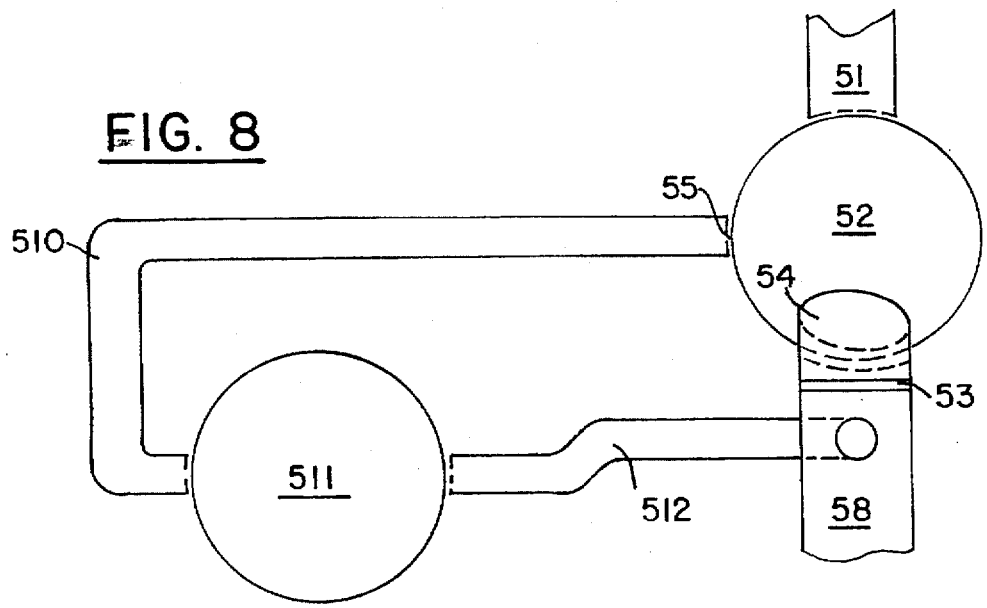
FIG. 8 is a top view of the modified form of FIG. 7.
Figure 9:
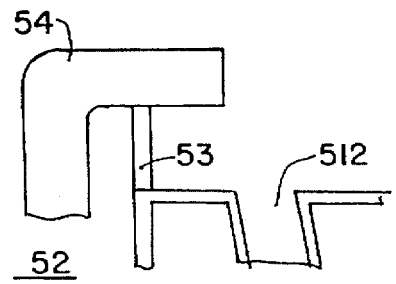
FIG. 9 is a detailed view of certain parts of the modified form of FIG. 7.
Figure 10:
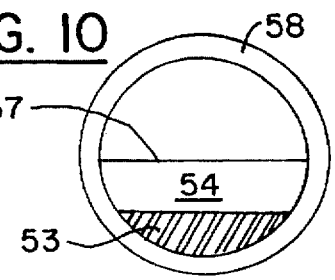
FIG. 10 is a detailed view of a portion of the outlet conduit 58 of FIG. 7.

In the preferred form of FIG. 1, the inlet tank 12 is a drop manhole underground and has an inlet 11. The inlet 11 is fed by the rainwater runoff from parking lots for example. This runoff may include oil that was left on the parking lot by automobiles. The runoff may vary from a small amount that has a very low rate of flow to a very high rate of flow. The low rate of flow may be the result of a person washing the lot with a hose or from a light rain. The very high rate of flow may be the result of a heavy downpour such as might occur during a thunderstorm. The inlet tank 12 and the main separation tank 21 are preferably of round cross-section and are drop manholes with their upper ends closed by manhole covers (not shown). The rainwater runoff enters the inlet tank 12 through inlet pipe 11 and fills the tank 12 until there is overflow at weir 13. Surface water is skimmed by weir 13.

When water overflows the weir 13, it builds up in enclosure 28, passes into pipe 20 and builds up in main separation tank 21. Any oil in the runoff water floats on the water in inlet tank 12 and also floats on the water in the main separation tank 21. When the fluid in tank 21 builds up to a level higher than the outlet (top) end of pipe 122 the clean water from the lower part of the main separation tank 21 flows via pipe 122 to outlet conduit 18. The outlet conduit 18 may discharge into a city sewer or a nearby river.

When the rate of flow of the runoff water passing through inlet 11 increases to an intermediate rate of flow, substantially clean water from inlet tank 12 passes upward through the vertical portions of the two pipes 14, then enters the horizontal portions of those pipes and discharges into outlet conduit 18 directly. Such discharge takes place downstream of the enclosure 28 since the horizontal portions of pipes 14 pass completely through the enclosure 28.

At a still higher rate of intake flow, the level of the liquid in tank 12, increases until there is a direct flow path from inlet tank 12 to the outlet conduit 18. This flow path is through the space above the roof 25 of enclosure 28 and extends from the inlet tank 12 to that part of the outlet conduit 18 which is downstream of the enclosure 28.

The operation of the system of FIG. 1 during different rates of flow of the inlet stream will now be described.

If rain falls at a very low rate, the inlet flow rate, in pipe 11, is slow. The inlet tank may have water and oil in it from a previous rain or it may begin to fill from the present rain. In either case the inlet tank fills until it begins to overflow the lowest part 24 of the U-shaped opening 22-24-22 of weir 13. Weir 13 skims the surface fluid and allows it to partially fill enclosure 28 then drain via pipe 20 to the main separation tank 21. The tank 21 fills until the fluid level in pipe 122 rises to the invert of outlet conduit 18. Since the conditions in tank 21 are very calm the oil floats on the water in this tank. Thus, the fluid fed from tank 21 via pipe 122 to outlet conduit 18 is clear water.

The water level in enclosure 28 must be higher than the outlet end of pipe 122 in order to have flow from the main separation tank 21 to outlet conduit: 18. This result is achieved in FIG. 1 by the weir 13 which holds water in enclosure 28 when pipe 20 is full. A separating means, in the form of a wall 26 in the conduit 18, is located between the inlet to the pipe 20 and the outlet of the pipe 122. In the preferred form of the invention, the separating means is the downstream end of the enclosure 28. This separating means raises the level of the fluid at the inlet of the pipe 20.

If now or at any later time the flow rate at the inlet pipe 11 increases to what may be called an intermediate flow rate, water in the two pipes 14 will pass clean (below surface) water from inlet tank 12 directly to outlet conduit 18, as previously explained.

If then, or later, the rate of flow in inlet pipe 11 increases to a very high rate, as during a heavy thunderstorm, the fluid in inlet tank 12 will rise rapidly and overflow the enclosure 28, passing above roof 25, and enter the outlet conduit 18.

It is noted that during the very high rate of flow, just described, fluid is still passing over weir 13 into enclosure 28 and via pipe 20 to the main separation tank 21, and from there via pipe 122 to outlet conduit 18. Moreover, during such very high rate of flow, water is still flowing through pipes 14 to the outlet conduit 18.

Similarly, during the intermediate rate of flow, water is flowing not only through pipes 14, but also over weir 13, through enclosure 28 to main separation tank 21, and via pipe 122 to the outlet 18.

While a very large flow of water through the outlet conduit 18 may cause a small Bernoulli effect upon the water in the main separation tank 12 and the pipe 122, the oil that is floating on the water in the main separation tank 12 will remain in place and substantially unaffected by the very large flow in outlet conduit 18. Even if the outlet conduit became partially or totally blocked, the oil that floats on the water in the main separation tank will remain in tank 12 and separated from the water therein irrespective of the amount of water received at inlet 11.

FIGS. 7 to 10 illustrate a first modified form of the invention. This modified form will now be described.

Water contaminated with oil enters the drop manhole 52, also sometimes hereinafter referred to as an inlet tank, through an orifice 51. In the drop manhole 52, the oil will float on the water. Solids will settle to the bottom of the drop manhole 52. As the drop manhole 52 fills with liquid, the oil (surface liquid) will rise to the surface. The surface elevation is controlled by a device such as the top surface 57 of pipe 54. The device must be such that it controls the surface elevation of the liquid such that it is higher than the ultimate outfall height to allow for the separation process to occur. As the liquid level rises it will first flow into a surface skimming outlet: port 55 which is connected to a pipe 510 which allows the surface skimmed material (oil) to flow into the oil collection manhole 511. This manhole 511 is hereafter sometimes referred to as a main separation tank. In this manhole, the oil will float on the surface. As additional oil flows into the oil collection manhole 511 it will displace water because the oil will float to the surface and the outlet of the manhole to pipe 512 is at a below surface elevation. Keeping the invert elevation of the outlet pipe 512 below that of the inlet pipe 510 is ideal. The outlet pipe 512 will then carry treated water (oil removed) to an orifice in the bottom of the clean water outlet conduit 58. This will be cleaned flow with sediment settled to the bottom of both manholes 52 and 511 and the oil removed and trapped in the oil collection manhole 511.

During relatively high flow volumes, rainwater enters the drop manhole 52, and flows through the skimming outlet port 55. The height of the fluid continues to rise in elevation until it reaches the height of the elbow in the clean bypass pipe 54. This pipe extends through dam 53. As the liquid level rises above the invert of the elbow of the clean bypass pipe 54, clean water will be forced through the pipe 54. Since the oil will be at or near the surface, and the entrance point of the liquid into the clean bypass pipe 54 is significantly below this, below surface (clean) water will enter the lower open end of the pipe 54 and the gravity, acting on the surface, will force the water up through the clean water bypass pipe 54 through the elbow in the clean bypass pipe 54 and through dam 53 to the clean water outlet: 58 as "cleaned" bypass flow. Meanwhile the surface liquids will continuously be treated by the process described in the paragraph above.

During an extreme flow situation (such as a thunderstorm), the system must continue to flow, and the height of the liquid in the drop manhole 52 rises to the elevation higher than the top 57 of the clean bypass pipe 54 and weir 53. The top 57 of the clean bypass pipe 54 will then act as a weir together with the elevation control dam 53 such that when the flow is so great that separation can no longer occur, the entire system goes into an untreated bypass mode so as not to cause any backup in the system during this severe storm event. At this point the surface flow will no longer be treated and will flow over the top 57 of the dam 53 and bypass pipe 54 directly to the clean water outlet 58. Flow will continue through the separation system but it will no longer be surface flow so the primary function of the system will cease. However, all previously separated liquid will remain contained in the collection manhole 511 until it is removed by pumping.

The elevation of the dam 53 determines the elevation of the liquid in the collection manhole 511 by the simple laws of gravity, since they are connected and vented. As the liquid in inlet tank 52 exceeds the elevation of the top 57 of weir 53 and the bypass elbow pipe 54, it will flow directly and untreated from the drop manhole 52 through to the clean water outlet 58.

The storage capacity of the collection manhole 511 can be increased by inserting a pipe into the collection manhole 511 with an invert higher than the incoming pipe 510 but such that the top of the calculated volume being no higher than the elevation of the crest height of dam 53. The pipe will have a bulkhead on the end with the length being determined by the volume of containment needed.

The system should be cleaned by pumping the collection manhole 511 and the invert of the drop manhole 52 as often as conditions require.

Should the likelihood exist for other deleterious floating particles to cause a blockage in the system, a screen can be inserted over the surface skimming outlet port 55 such that the deleterious material is kept in the drop manhole 52 and out of the oil collection/separation system.

Figure 11:
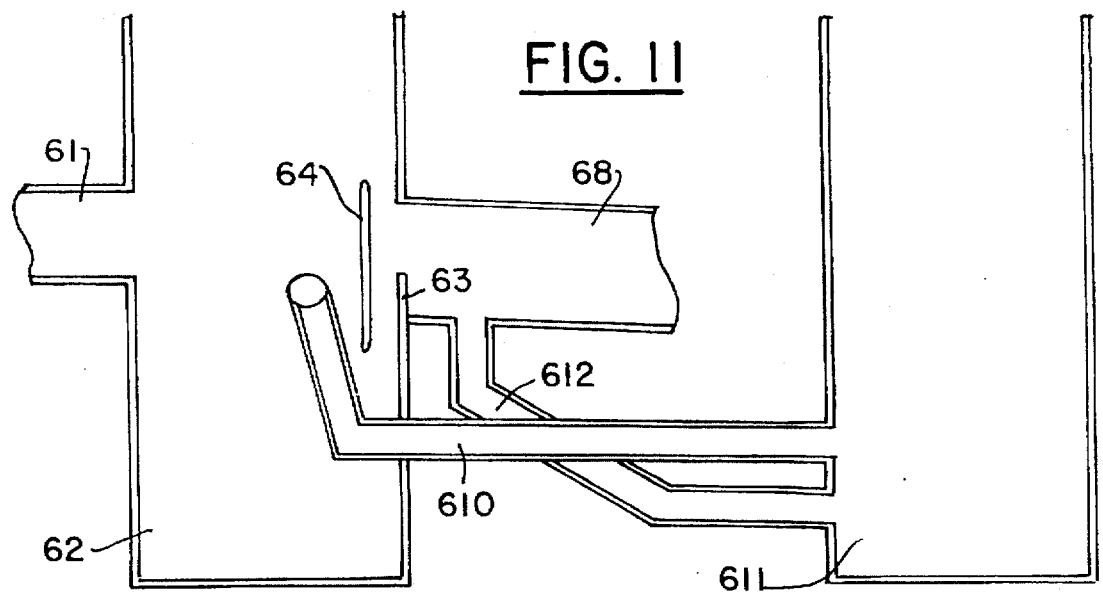
FIG. 11 is a schematic view of a second modified form of the invention.
Figure 12:
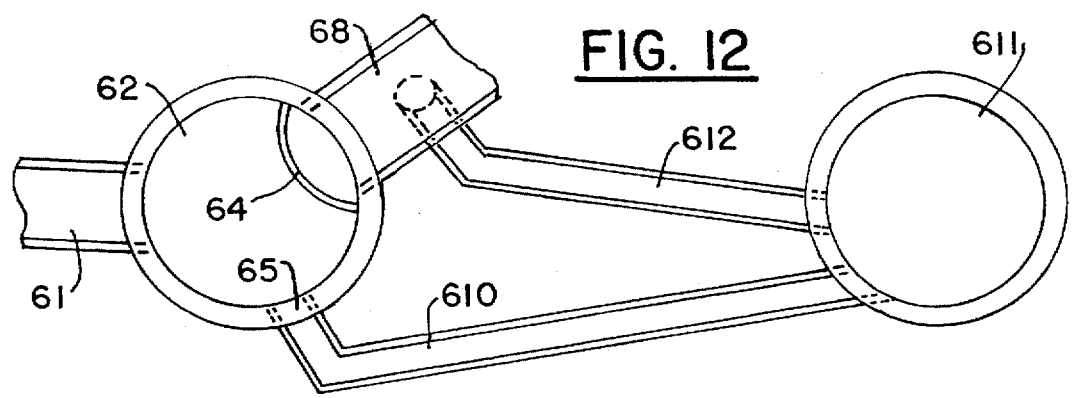
FIG. 12 is a top view of said second modified form of FIG. 11.

FIGS. 11 and 12 illustrate a modified form of the invention. In those figures inlet pipe 61 feeds a runoff of rain water and oil to inlet tank (or drop manhole) 62. The inlet tank 62 has a weir 63 at the connection between outlet conduit 68 and inlet tank 62. An open baffle 64 protects the inlet of the output conduit 68 from a large input flow from pipe 61, and avoids disturbing the water that is about to enter the outlet conduit 68. The baffle 64 forms a semi-cylindrical sheet around the inlet of the outlet conduit 68. All side edges of the baffle 64 may be sealed to the inside wall of the inlet tank 62 to prevent leakage. The top and bottom ends of the baffle 64 are open, so that water can flow both over and under baffle 64 on its way to outlet conduit 68. The open end at the bottom of the baffle, is well below the level of any surface oil. Since the oil floats on the water, oil cannot move low enough in tank 62 so as to enter the open bottom of the baffle 64. Thus, in the absence of a high rate of flow of the incoming water, even if the outlet 65 becomes clogged, oil will not enter outlet conduit 68 but will build up in inlet tank 62 until that tank is cleaned. Pipe 610 receives fluid from opening 65 and delivers it to a low level of the main separation tank 611. Further, pipe 612 delivers water from a low level of tank 611 to output conduit 68. The top of weir 63 lowermost part of opening 65 are at a higher level than the output end of pipe 612.

When the stream of water entering inlet pipe 61 increases to an intermediate rate of flow, the water will rise to the elevation of the top of weir 63. Then the baffle 64 will cause below surface water (without oil) to be forced by gravity under baffle 64 and over weir 63 to the outlet conduit 68.

Then if there is a heavy flow of liquid such as during a thunderstorm, the liquid will rise in manhole 62 so that it crests at a level higher than the baffle 64 and flows directly to conduit 68 as untreated bypass flow. Meanwhile, the two previously said flows continue and all oil collected in the storage or collection manhole 611 remains there until removed under maintenance by pumping.

When the runoff stream that enters pipe 61 has a very low rate of flow the fluid level in tank 62 rises until it overflows into opening 65 that is in the sidewall of tank 62. This overflow passes to tank 611 and raises the fluid level in that tank until clean water from the lower half of tank 611 passes through pipe 612 to the output conduit 68.

When the stream of water entering inlet pipe 61 has a high rate of flow the events described in the immediately preceding paragraph also happen. In addition, water in tank 62 rises rapidly and overflows weir 63 and directly enters output conduit 68 without passing through tank 611.

Another form of the invention is carried out if the inlet tank 12 (FIG. 1) is omitted and inlet pipe 11 connected directly to the inlet end of outlet conduit 18. The enclosure 28, the weir 13 and pipes 20 and 22 remain but pipes 14 are omitted. In this form of the invention runoff water entering at a relatively low rate builds up and flows over weir 13 and into enclosure 28. From there the water flows via pipe 20 to the main separation tank 21. When the fluid in tank 21 rises above the level of outlet conduit 18, water flows via pipe 22 from tank 21 to the outlet conduit 18. If the runoff water enters at a very high rate it soon overflows enclosure 28 and passes over roof 25 directly to outlet conduit 18.

Except for the enclosure 28 (FIG. 1) and the parts associated with that enclosure, all of the separate components of the invention can be constructed with widely available construction materials, using well known construction techniques. Thus, the various parts, individually, of the invention can readily be fabricated by local contractors using locally available materials, except as noted above.

My invention is shown and described as a device for separating oil from rainwater. At least some forms of the invention may have other applications where it is desirable to separate fluids of different densities.

As previously explained, the oil remains in the main separation tank. In all forms of the invention the oil may be easily removed from that tank by removing the manhole cover over that tank and pumping the oil from the surface of the tank.

Moreover, all forms of my invention may be easily cleaned from time to time. To clean the system, the manhole covers are removed, and the fluid in the tanks pumped out. The cleaning personnel will then have access to the tanks.

Figure 13:
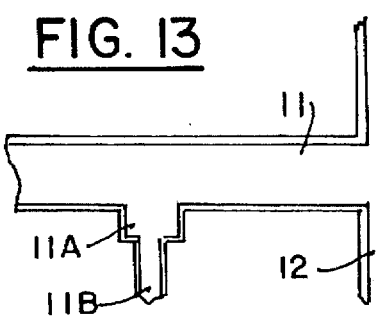
FIG. 13 shows a modified form of the inlet pipe that may be used with the invention.

FIG. 13 shows a modified form for collecting the water and oil and delivering them to the main separation tank 122 when the input flow is at a very low rate. Here, the very slow input flow falls into stub 11a and drains into pipe 11b which in turn feeds the main separation tank 122. This form of feeding tank 122 may be in addition to, or in place of, the enclosure 28 and the pipe 20. A further modification involves feeding the inlet (runoff) water into the open top of the inlet tank.

Figure 14:
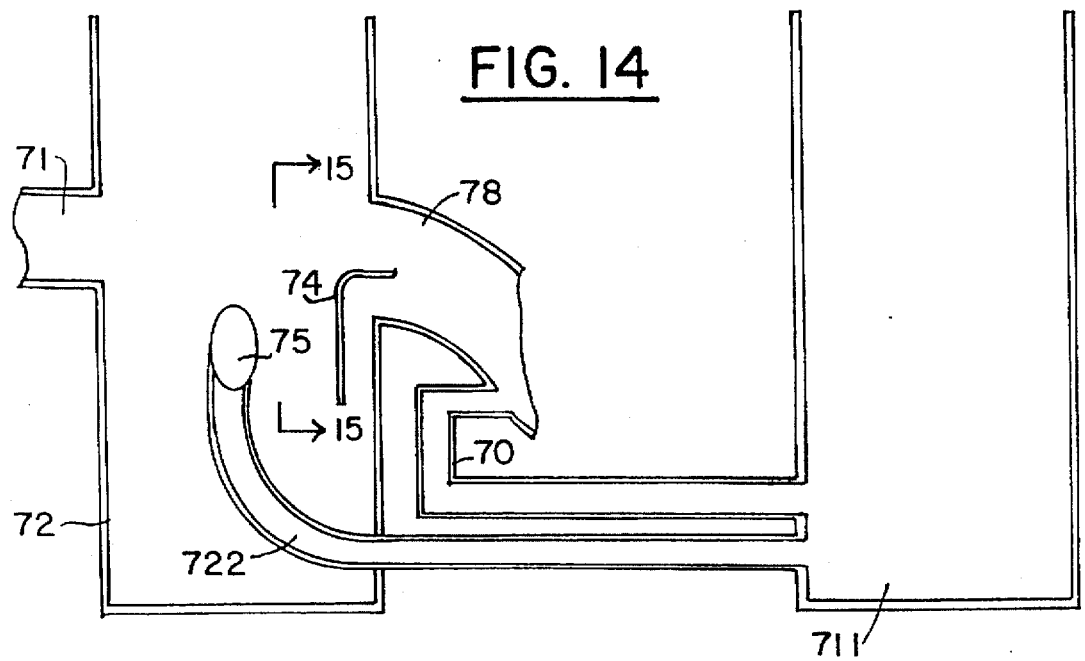
FIG. 14 is a schematic diagram of another modified form of the invention.
Figure 15:
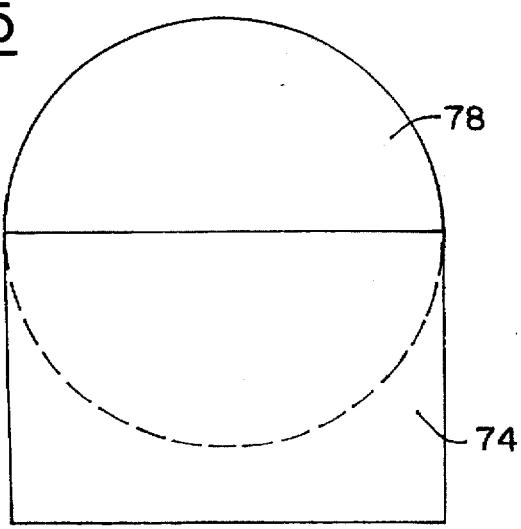
FIG. 15 is a cut-away view along line 15—15 of FIG. 14.

FIG. 14 shows a further modified form of the invention. The inlet tank 72 receives runoff water (that may contain oil) through inlet pipe 71. At very low rates of input flow, water drains through ellipitical opening 75 to pipe 722 to main separation tank 711. Fluid in tank 72 passes through opening 75 in the sidewall of tank 72. The lower end of opening 75 is located at a lower level than the upper outlet opening in conduit 74, and the inlet opening into outlet conduit 78 is at a higher level than the outlet of conduit 74. Clean water from tank 711 passes upward through pipe 70 to outlet pipe 78. The upper end of pipe 70 must De lower than the lower end of opening 75. When there is an intermediate rate of flow entering pipe 71, the water builds up in conduit 74 until it overflows into outlet conduit 78. Unlike the pipes 14 in FIG. 1, the conduit 74 completely blocks the lower part of the inlet opening to outlet conduit 78 (as shown in FIG. 15) so that until the water builds up in tank 72 to a level of the top of conduit 74, no water can flow directly into outlet conduit 78 from the interior of tank 72.

Finally, when there is a very high rate of flow into tank 72 the main body of the water entering in tank 72 overflows the top of conduit 74 and passes directly into outlet Conduit 78. The outlet conduit 78 has the shape shown in FIG. 14.

The word "manhole" is hereby defined as a hole in the ground for holding a liquid. The hole may be lined with a wall, or have a tank in it, so that it will hold the liquid without leakage.

I claim to have invented:

1. Apparatus for separating a relatively light fluid from a relatively heavy fluid in a stream of fluid that may vary in its rate of flow from a very low to a very large rate, comprising:

an inlet tank for receiving said stream, a main separation tank for separating at least some of the relatively light fluid from the relatively heavy fluid by allowing relatively light fluid to float on the relatively heavy fluid, outlet means which, when said stream has a relatively very low rate of flow, feeds fluid from the surface of the fluid in said inlet tank to said main separation tank so that any relatively light fluid in said stream may float on the relatively heavy fluid in said main separation tank, conduit means, including an outlet conduit having an overflow means in communication with said inlet tank, which when said stream has a relatively very large rate of flow allows fluid of said stream to flow from said inlet tank to said outlet conduit without passing through said main separation tank, and means for receiving relatively heavy fluid from below the surface of the fluid in said inlet tank and feeding such relatively heavy fluid to said outlet conduit comprising a conduit having an inlet: below the surface of the fluid in said inlet tank and an outlet in said outlet conduit.

2. Apparatus as defined in claim 1, in which said means which feeds fluid from said input means to said main separation tank comprises a passageway means that has an opening in it that communicates with the inlet tank and permits fluid in the inlet tank to flow into said passageway and to said main separation tank when the fluid in the inlet tank rises to the level of said opening.

3. Apparatus as defined in claim 2 in which said opening becomes larger as its height increases.

4. Apparatus as defined in claim 2 in which said means which when said stream has a relatively very large rate of flow allows water of said stream to flow directly from said input tank to said outlet: conduit comprises a connection of said outlet conduit to said inlet tank at a level higher than said opening enabling the relatively heavy fluid, during a relatively very large rate of flow, to rise in the inlet tank above the level of said opening and to flow into said outlet conduit.

5. Apparatus as defined in claim 1, in which:

said outlet conduit has an inlet end that opens directly into said inlet tank, said means which, when said stream has a relatively very low rate of flow, feeds fluid from said input tank to said main separation tank, comprises (1) an enclosure mounted in the outlet conduit, said enclosure having an inlet opening in communication with said input tank, and also having an outlet opening, and (2) a pipe connecting said outlet opening to said main separation tank.

6. Apparatus as defined in claim 5 wherein said enclosure is located in a lower portion of said outlet conduit, said conduit means comprising means, when said large rate of flow occurs, for passing fluid of said stream over said enclosure in said outlet conduit.

7. Apparatus as defined in claim 6 in which said inlet opening has increased width as its height increases.

8. Apparatus as defined in claim 5 in which said inlet opening has increased width as its height increases.

9. Apparatus as defined in claim 5, comprising:

said means for receiving, comprising a pipe in said inlet tank, that is generally upright, and which has a generally horizontal portion that passes through said enclosure and has a portion thereof higher than the lowest portion of said inlet opening thereby limiting the flow through said pipe to a condition where the fluid level in said inlet tank is substantially above the lowest part of said inlet opening.

10. Apparatus as defined in claim 1, in which said outlet conduit has a lower sidewall, an enclosure located on said lower sidewall in said outlet conduit, said enclosure having an upstream end, a bottom side and a top, said enclosure being closed on all sides except that it is open at its upstream end and feeds said outlet means through its bottom side, said conduit, that has an inlet below said surface, passing through said enclosure and discharging the fluid passing through it downstream of said enclosure.

11. Apparatus as defined in claim 10, in which said enclosure has an upstream face, said upstream face defining a water entrance opening that gets wider as its elevation increases.

12. A system for separating oil and water, comprising:

input means including an inlet tank that may receive a fluid, that includes oil and water, and whose volume may vary from a relatively low to a relatively high rate of flow, means, including a main separation tank, which when fed with water and oil, will allow the oil to float on the water, said tank having a side wall that defines a chamber in which said floating takes place, with relatively clean water below the floating oil, said chamber having an inlet and an outlet, an outlet conduit, said inlet tank comprising means for feeding water from said inlet tank to said outlet conduit when the rate of flow of said fluid is relatively high, a first additional conduit for receiving water and oil from said inlet tank and feeding such water and oil to said inlet of said chamber, a second additional conduit for receiving water from said outlet of said chamber and delivering such water to said outlet conduit, said inlet to said chamber feeding fluid to said lower portion of said chamber and said outlet of said chamber receiving fluid from said lower portion of said chamber, said first and second additional conduits being connected to said outlet conduit at adjacent locations with said second additional conduit connected to the outlet conduit downstream of the location at which said first additional conduit is connected to said outlet conduit, and separating means in said outlet conduit between said locations for separating said additional conduits and thereby raising the level of the fluid entering said first additional conduit.

13. A system as defined in claim 12, in which said inlet to said chamber is at a higher elevation than said outlet of said chamber.

14. In a system for separating a first fluid that is lighter than a second fluid wherein the rate of flow of the second fluid may vary from a relatively low volume to a relatively high volume, comprising:

first and second tanks, inlet means that feeds said fluids to said first tank, means for receiving said fluids from said first tank and delivering both said fluids to said second tank, when the rate of flow of said second fluid to said first tank is relatively low, an outlet conduit, at least a portion of said second tank having a level at least as high as the level of at least a portion of said outlet conduit, said second tank comprising means for separating said first and second fluids, and means for discharging from said second tank at least some of said second fluid, that is substantially free of said first fluid, while allowing said first fluid to collect in said second tank, said first tank having a side wall, said inlet means feeding said tank through said side wall, said outlet conduit receiving fluid through said side wall, said first tank providing a direct passageway from said inlet means to said outlet conduit through which said second fluid, when entering said first tank at said relatively high volume, may freely pass without obstruction.

15. A device for separating oil from rainwater, comprising:

an outlet conduit that has an inlet end and which defines a passageway for passing rainwater, said passageway having a lower part, an enclosure mounted in said lower part of said passageway, said enclosure having a water entrance for said enclosure near said inlet end, said enclosure also defining an outlet drain opening, said enclosure having a top and being closed on all sides, except at said water entrance and at said drain opening, means for feeding rainwater that may contain oil to said inlet end of said outlet conduit, said enclosure having a size substantially less than the size of said passageway to thereby provide a space in said outlet conduit around said enclosure thus permitting rainwater entering said inlet end at a relatively high flow rate to pass around said enclosure, said outlet conduit and said enclosure comprising means for (1) allowing rainwater entering said inlet end at a relatively low rate of flow to enter said enclosure and to exit said enclosure via said drain opening, and (2) allowing rainwater entering said inlet end at a relatively high rate of flow to flow around said enclosure and to enter said outlet conduit downstream of said enclosure, a pipe extending through said enclosure and having an open end outside said enclosure but inside said outlet conduit, and said pipe having an inlet end upstream of said enclosure for receiving rainwater that is relatively free of oil when the rate of flow of the rainwater through the device exceeds said relatively low rate.

16. A device as defined in claim 15, in which said enclosure has a weir at said water entrance.

17. A device as defined in claim 15, comprising:

a separation tank, means for feeding fluid at said drain opening to said separation tank, and conduit means connecting said separation tank to said outlet conduit, downstream of and adjacent to said enclosure, for discharging clean water from said separation tank.

* * * * *